July 20, 1943.  E. F. POWELL ET AL  2,324,644
VULCANIZING RUBBER ARTICLES
Filed Jan. 22, 1942
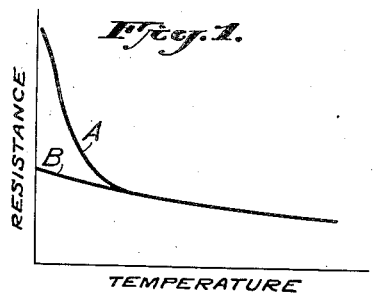
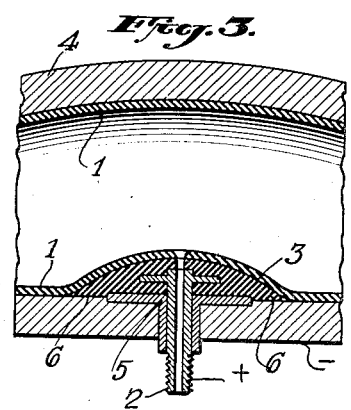
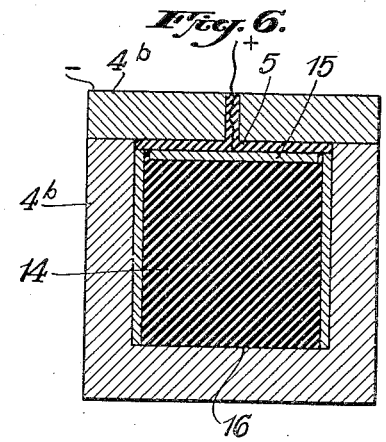
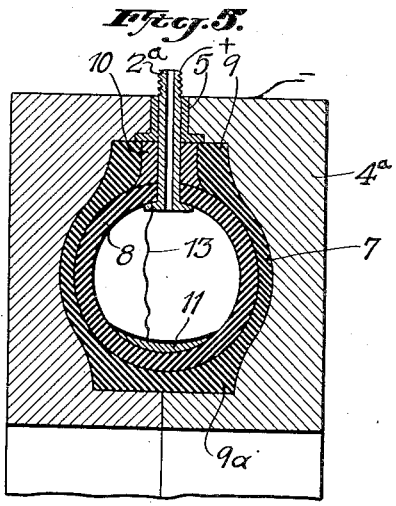
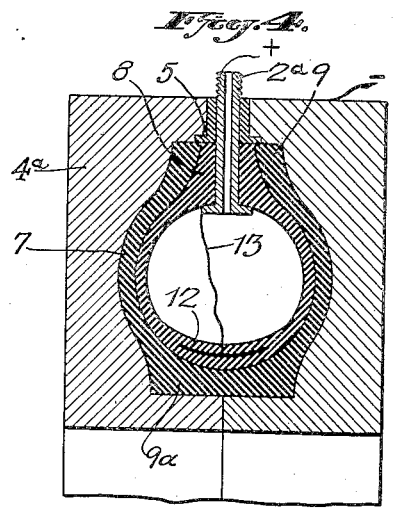
INVENTORS
ERNEST FREDERICK POWELL
DOUGLAS BULGIN.
PHILIP WALTER BADHAM.
BY
Benj. T. Rauber ATTORNEY Patented July 20, 1943

2,324,644

UNITED STATES PATENT OFFICE 2,324,644

VULCANIZING RUBBER ARTICLES

Ernest Frederick Powell, Sutton Coldfield, and Douglas Bulgin and Philip Walter Badham, Erdington, Birmingham, England, assignors to Dunlop Tire and Rubber Corporation, Buffalo, N. Y., a corporation of New York Application January 22, 1942, Serial No. 427,738
In Great Britain November 11, 1940

7 Claims. (Cl. 18—38)

This invention concerns improvements in vulcanizing articles made of rubber or the like particularly articles of varying or substantial thickness such as pneumatic tubes and tires or solid articles in its application to which the invention will be more particularly described.

Tubes for pneumatic tires are commonly provided with inflating valves having rubber bases which are vulcanized to the surface of the tube, and difficulty has been experienced hitherto in obtaining an optimum state of vulcanization of the rubber of the tube beneath the rubber base of the valve.

To overcome this difficulty additional local heat has been provided by supplementary heating devices secured to the mould adjacent the valve, but even with this assistance it is difficult to avoid over vulcanization of the body of the tube while assuring the minimum satisfactory state of vulcanization of the region covered by the base of the valve.

The present invention provides an improved process whereby sufficient local heat may be generated in situ to ensure a more uniform and satisfactory state of vulcanization, such local heating in the case of the valves for pneumatic tires obviating over vulcanization of the main or body portion of the valve.

Similarly those portions of a pneumatic tire such as the beads and tread which are thicker than the sidewalls, tend to be less vulcanized than the sidewall. Additional heat may be supplied by local heat generated in particular portions of the air bag adjacent thereto whereby greater uniformity of vulcanization is obtained.

In the normal vulcanization of a thick rubber article by means of heat applied externally, a relatively long period must be allowed for the heat to penetrate or soak into the center of the article in order that some approximation to uniform vulcanization can be obtained.

By constructing such articles wholly or in part of electrically conductive rubber and passing an electric current through such rubber, heat may be liberated in situ whereby the temperature of such central or other portion can be rapidly raised to vulcanizing temperature.

Since electrically conductive rubber has a resistance which decreases with increase in temperature particularly in the case of unvulcanized electrically conductive rubber at temperatures below vulcanizing temperature as described below, it is desirable that the temperature of the unvulcanized electrically conductive rubber shall be raised sufficiently prior to the application of electrical energy to avoid local high current flow and over heating developing from initial small local differences of temperature.

Such technique, however, is unnecessary in the case of previously heated or part or wholly vulcanized electrically conductive rubber since the negative temperature coefficient of resistance has a much lower value than that of unvulcanized or unheated electrically conductive rubber.

According to this invention we provide a method of vulcanizing the whole or a portion of a rubber article which comprises heating said article or portion by passing an electric current through electrically conductive rubber adjacent to, or integral with, said article subsequently to, or concurrently with, the application of external heat to said conductive rubber.

Heat may be applied independently to said article for example by external steam heat for the purpose of assisting or completing the vulcanization of parts of the article not composed of conductive rubber.

Such external heating may be dispensed with if the conductive rubber has been previously heated or vulcanized where the parts of the article not composed of electrically conductive rubber are adjacent to the conductive rubber, or may be combined with electrical heating for the purpose of completing the vulcanization of both the conductive and non-conductive rubber parts of the article.

The various features of the invention are illustrated by way of example in the accompanying drawing in which: Fig. 1 is a diagram showing a typical resistance temperature curve for electrically conductive rubber. Fig. 2 is a diagrammatic representation of an electrical circuit for controlling the flow of current through the conductive rubber. Fig. 3 is a part sectional view of a mould and of a pneumatic tire tube having a valve portion embodying electrically conductive rubber.

Fig. 4 is a part sectional view of a mould containing a pneumatic tire and air bag composed of electrically conductive rubber. Fig. 5 is a part sectional view of a mould containing a pneumatic tire and an air bag embodying electrically conductive rubber. Fig. 6 is a part sectional view of an externally heated mould for the electrical vulcanization of a solid article composed of unvulcanized electrically conductive rubber.

Referring to Fig. 1, curve A represents the decrease in resistance with increase in temperature of unvulcanized electrically conductive rubber when heated from room temperature for the first time, while curve B shows the decrease of resistance in the temperature on the second and subsequent heating of such rubber.

These curves show that the rate of decrease of resistance with increase in temperature is very high in the initial stages of curve A, and is relatively small in its later stages, while it is also relatively small in all stages of curve B.

It is, therefore, desirable that previously unheated electrically conductive rubber shall be heated independently as by external heat so as to transfer the resistance temperature relationship from curve A to curve B prior to the application of appreciable quantities of electrical energy, as otherwise there is considerable tendency for localized high temperature paths to develop in the electrically conductive rubber owing to the resistance of such paths being considerably less than that of the mass of the conductive material.

Consequent upon the negative temperature coefficient of resistance if an excessive voltage be applied to the electrically conductive rubber an uncontrollable increase of current and of temperature may result. To prevent this happening the voltage applied must be suited to the rate of dissipation of heat from the article as for example by conduction, and it is also desirable to introduce means whereby the voltage applied to the electrically conductive rubber of the article C, Fig. 2, decreases as the current rises by the inclusion in the circuit of a series resistance R preferably having a positive temperature coefficient, that is to say, a resistance which increases in value with rise in temperature.

As shown in Fig. 3, the invention is applied to the manufacture of an inflatable article such as a tire tube 1 which is provided with a valve 2 having a base flange 3 formed of electrically conductive rubber which may be extended if desired to cover or constitute the stem of the valve 2.

To confine the current to the desired path, the base flange 3 and stem of the valve 2 are insulated from the metal of the pot or mould 4 in which the tube 1 is positioned for vulcanization by insulating members 5 of smaller area than the base flange 3, thereby leaving an annular ring or margin 6 of conductive rubber in contact with the metal of the mould thus providing a predetermined path between the valve stem 2 and the marginal portion 6.

The electrical circuit is completed by connecting the source of electrical supply to the conductive stem of the valve and to the metal of the mould, and the resultant current flows through the stem and thence radially to the surrounding metal of the mould through the conductive rubber to complete the circuit, which it may be arranged to interrupt in any convenient manner when the pot or mould is opened.

It will be readily understood that the insulating material for example paper, textile fabric, Bakelite or non-conductive rubber may be attached to the metal mould if desired or it may be embedded in the base flange and/or stem of the valve or may be detachably secured thereto or positioned thereon.

In obtaining a more uniform state of vulcanization of a pneumatic tire as shown in Fig. 4, heat may be obtained from an air bag 8 and in particular increased heat is required at the beads 9 and beneath the tread 9a of the tire 7 because these parts are of relatively greater thickness than the sides of the tire.

The additional heat required may be provided by heat obtained by passing an electric current through an air bag 8 composed of electrically conductive rubber. The current may be introduced into the air bag by electrodes diametrically opposite to one another at least one of which may constitute the inflating valve 2a for inflating the air bag and the other of which may be formed of contacts 12 embedded in the conductive rubber and connected to the valve 2a by suitable flexible connections 13 for correctly distributing the electrical energy. The metal of the mold 4a serves as the other terminal of the circuit.

The thickness of the air bag wall may be increased adjacent to the above mentioned parts 9 and 9a to provide the increased heat required by causing more current to flow through these portions due to their relatively greater conductivity and proximity to the electrodes 2a and 12.

Alternatively as shown in Fig. 5, the same purpose may be served by embedding elements 10 and 11 of electrically conductive rubber adjacent to those parts 9 and 9a at which the additional heat is required.

An insulating member 5 may be provided around the valve stem for a similar purpose to that described with reference to Fig. 1.

As shown in Fig. 6, a metal mould 4b may be used to form an article 14 composed of or containing a mass of unvulcanized electrically conductive rubber of substantially uniform cross-section.

The mould 4b is subjected to external heat and subsequently thereto an electric current is passed through the electrically conductive rubber from an electrode 15 insulated from the mould 4b by insulating material 5 which material is extended to surround the whole of the surface area of the rubber mass in contact with the mould except that surface on the opposite face 16 of the electrically conductive rubber through which the current entering from the electrodes 15 passes from the electrically conductive rubber into the mould.

The voltage at which the circuit is supplied is determined by the dimensions of the conductive portions of the article and by the conductivity of the composition of the electrically conductive rubber, and may be either direct or alternating for example at the normal supply figure of 50 cycles per second.

The rubber may be rendered electrically conductive by incorporating carbonaceous material such as acetylene black or conductive carbon blacks in sufficient proportion to give the required conductivity.

Having now described our invention, we claim:

1. The method of vulcanizing rubber which comprises applying external heat to electrically conductive unvulcanized rubber to be vulcanized and passing an electric current through said electrically conductive rubber.

2. The method according to claim 1 wherein the electrically conductive rubber is partially vulcanized prior to vulcanizing by the combined electrical and external heating.

3. A mold for vulcanizing tire tubes having an opening for a valve stem and a layer of electrical insulating material lining said opening.

4. A mold for vulcanizing tire tubes having an opening for a valve stem and a layer of electrical insulating material lining said opening and the surrounding inner surface of said mold.

5. The method of vulcanizing a rubber tire tube having a valve stem and a locally thickened wall at the base of said valve stem which comprises forming said thickened part of said tube of unvulcanized conductive rubber, heating said tube including said mass of conductive rubber and passing an electric current through said mass of conductive rubber during said heating.

6. The method of vulcanizing rubber articles according to claim 1 wherein the external heat is applied to and the electric current is passed through the article while the same is in a metal mold and wherein electrical insulating material is interposed between the conductive rubber and the metal of the mold containing said article to confine the electrical current to a predetermined path.

7. The method of vulcanizing in a mold a pneumatic tire tube of non-conductive rubber having a valve base flange of conductive rubber which comprises partially insulating said valve base flange from said mold, applying external heat to said mold and to said electrically conductive unvulcanized rubber base tire flange and passing an electric current through said electrically conductive rubber.

ERNEST FREDERICK POWELL.
DOUGLAS BULGIN.
PHILIP WALTER BADHAM.